US012359578B2

(12) United States Patent
Bailey et al.

(10) Patent No.: US 12,359,578 B2
(45) Date of Patent: Jul. 15, 2025

(54) SINGLE-PIECE ANNULAR VANE ARRAY FOR A GAS TURBINE ENGINE

(71) Applicant: ROLLS-ROYCE plc, London (GB)

(72) Inventors: Jonathon Bailey, Derby (GB); Basile Vigneron, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/646,115

(22) Filed: Apr. 25, 2024

(65) Prior Publication Data

US 2024/0384658 A1 Nov. 21, 2024

(30) Foreign Application Priority Data

May 16, 2023 (GB) .................................... 2307284

(51) Int. Cl.
*F01D 9/04* (2006.01)
*F01D 25/16* (2006.01)

(52) U.S. Cl.
CPC ............ *F01D 9/041* (2013.01); *F01D 9/042* (2013.01); *F01D 25/164* (2013.01); *F05D 2220/32* (2013.01); *F05D 2230/31* (2013.01); *F05D 2240/12* (2013.01); *F05D 2240/55* (2013.01)

(58) Field of Classification Search
CPC ..... F01D 9/00; F01D 9/02; F01D 9/04; F01D 9/041; F01D 9/042; F01D 25/162; F01D 25/164; F05D 2230/30; F05D 2230/31; F05D 2240/12; F05D 2240/55; F05D 2260/96; F05D 2220/32
See application file for complete search history.

(56) References Cited

U.S. PATENT DOCUMENTS

| | | | | |
|---|---|---|---|---|
| 8,128,339 | B2 | 3/2012 | Kondo et al. | |
| 11,015,486 | B2 | 5/2021 | Seo | |
| 2012/0321447 | A1* | 12/2012 | Dijoud | F01D 9/041 415/142 |
| 2016/0215699 | A1* | 7/2016 | Suciu | F01D 9/041 |
| 2018/0112672 | A1 | 4/2018 | Ganiger et al. | |
| 2018/0209274 | A1 | 7/2018 | Zatorski et al. | |
| 2019/0022927 | A1* | 1/2019 | Vial | B29C 64/153 |
| 2019/0085698 | A1 | 3/2019 | Van Der Merwe et al. | |
| 2019/0249570 | A1* | 8/2019 | Barua | B22F 5/009 |
| 2020/0408109 | A1* | 12/2020 | Hallouin | F01D 9/065 |
| 2021/0087942 | A1 | 3/2021 | Kulinski et al. | |

FOREIGN PATENT DOCUMENTS

CN 111727303 A 9/2020

OTHER PUBLICATIONS

Great Britain search report dated Oct. 27, 2023, issued in GB Patent Application No. 2307284.6.
European search report dated Sep. 23, 2024, issued in EP Patent Application No. 24170397.4.

* cited by examiner

*Primary Examiner* — Elton K Wong

(57) ABSTRACT

A single-piece annular vane array for a gas turbine engine. The single-piece annular vane array comprises at least one mounting feature, a ring of stator vanes, and at least one baffle. The at least one baffle is attached at a first radial location to the ring of stator vanes, and is attached at a second radial location to the at least one mounting feature. The at least one baffle is deformable.

20 Claims, 9 Drawing Sheets

SINGLE-PIECE ANNULAR VANE ARRAY FOR A GAS TURBINE ENGINE

CROSS-REFERENCE TO RELATED APPLICATIONS

This specification is based upon and claims the benefit of priority from United Kingdom patent application GB 2307284.6 filed on May 16, 2023, the entire contents of which is incorporated herein by reference.

BACKGROUND

Technical Field

The present disclosure concerns an annular vane array for a gas turbine engine. More particularly, the present disclosure concerns a single-piece annular vane array for a gas turbine engine. The single-piece annular vane array may be suitable for transmitting mechanical load between portions of the gas turbine engine.

Description of the Related Art

Vane arrays for gas turbine engines are known, as non-rotating (static) vanes are commonly used to increase the static pressure of a working fluid passing through the engine, changing the direction of flow of the working fluid between exit from an adjacent upstream rotor to entry to an adjacent downstream rotor.

Some vane arrays for gas turbine engines may be structural, as they transmit mechanical load between portions of the gas turbine. These vane arrays may additionally control component movements and may accommodate thermal stresses caused by operation of the gas turbine engine. As a result, these vane arrays have complex shapes and may be formed from multiple sub-structures that are joined together by mechanical interfaces, such as arrangements of bolts.

The use of mechanical interfaces to join the sub-structures of the vane array has several disadvantages. For example, it may lead to an increase in overall engine weight and/or reduce the ease with which the gas turbine engine may be assembled.

There is therefore a need for a vane array that addresses at least some of those disadvantages or at least provides a useful alternative to known structures.

SUMMARY

According to a first aspect there is provided a single-piece annular vane array for a gas turbine engine. The single-piece annular vane array comprises at least one mounting feature, a ring of stator vanes and at least one baffle. The at least one baffle is attached at a first radial location to the ring of stator vanes and is attached at a second radial location to the at least one mounting feature (31,32). The at least one of the baffle is deformable.

The single-piece annular vane array is a single unitary component, i.e. it is a one piece, homogenous or monolithic component that is integrally manufactured, for example using additive layer manufacturing.

According to a second aspect, there is provided a gas turbine engine that includes the single-piece annular vane array.

The above single-piece annular vane array has the advantage that an improved tolerancing may be obtained, as the single-piece annular vane array may be used in place of an assembly of components (sub-structures), each having at least one interface with another component of the assembly of components. A single piece structure may therefore be manufactured more rapidly that a functionally-equivalent assembly of components. Engine assembly time may also be reduced, as may overall engine mass. Reducing engine mass may be particularly advantageous if the gas turbine engine comprising the single piece annular vane array is used in aerospace applications.

Improving tolerancing, due to a reduced number of interfaces of the single-piece annular vane array relative to a functionally equivalent assembly of components, may also have benefits at a gas turbine engine level. For example, the improved tolerancing may lead to an improved metering of airflow and/or gaps between the single-piece annular vane array and adjacent engine components. This may lead to a relative reduction in fuel consumption of the gas turbine engine, and/or a relative reduction in temperature of either a portion of the single-piece annular vane array or a portion of adjacent component for no change in engine power setting.

The ring of stator vanes may be stator vanes of a compressor of the gas turbine engine or stator vanes of a turbine of the gas turbine engine.

The at least one mounting feature may be an inner mounting feature.

The inner mounting feature may locate a bearing of the gas turbine engine.

The at least one mounting feature may be an outer mounting feature.

The outer mounting feature may connect the single-piece annular vane array to a casing of the gas turbine engine 10 and/or may form a portion of the gas turbine engine.

The at least one baffle may be a radially inner baffle, attached at its first radial location to the ring of stator vanes and attached at its second radial location to an inner mounting feature.

The at least one baffle may be a radially outer baffle attached at its first radial location to the ring of stator vanes and attached at its second radial location to an outer mounting feature.

Several examples are envisaged, comprising different arrangements of baffles.

In one example, the single-piece annular vane array comprises a radially inner baffle but does not comprise a radially outer baffle. In another example, the single-piece annular vane array comprises a radially outer baffle but does not comprise a radially inner baffle. In a further example, the single-piece annular vane array comprises a radially outer baffle and a radially inner baffle.

Determination of the whether the single-piece annular vane array comprises a radially inner baffle and/or a radially outer baffle may be dependent upon the structural architecture of the gas turbine engine 10 comprising the single-piece annular vane array, and/or the location of the single-piece annular vane array within the gas turbine engine.

For example, the structural architecture may not require a bearing of the gas turbine engine 10 to be supported in the vicinity of the single-piece annular vane array.

In these examples, the single-piece annular vane array is not required to locate a bearing and therefore does not require an inner mounting feature to do so. In this structural architecture, a radially inner baffle that would otherwise connect other portions of the single-piece annular vane array to the inner mounting feature is also not required. However, as the single-piece annular vane array must be located relative to other components of the gas turbine engine, a different mounting feature, such an outer mounting feature would be required, to connect the array to these components.

Similarly, as is discussed in more detail below, a potential advantage of incorporating a baffle within the single-piece annular vane array is that it may accommodate thermally-derived stresses caused by operation of the gas turbine engine.

However, if the single-piece annular vane array is located within a portion of the gas turbine engine array that is not subject to significant variation in temperature, the single-piece annular vane array may not be required to accommodate these stresses and may therefore not require such a baffle.

For example, the single-piece annular vane array may be located in a forward stage of a compressor of a gas turbine engine.

In this case, the vane array may not comprise a radially outer baffle, as there may be no requirement to tolerate significant thermally-derived stresses. However, the vane array may comprise an inner mounting feature to locate a bearing, and consequently, may comprise a radially inner baffle and inner mounting feature to mount the bearing.

In this example, the single-piece annular vane array may also comprise an outer mounting feature, directly connected to the ring of stator vanes (i.e., there may be no intervening radially outer baffle). The outer mounting feature may connect the single-piece annular vane array to other components of the engine, such as an engine casing.

The at least one baffle may be elastically deformable and/or plastically deformable.

An advantage of an elastically deformable baffle is that the baffle, and the single-piece annular vane array comprising the baffle, may deform as an engine power setting of a gas turbine engine comprising the vane array varies with engine power setting. Thus, clearances between the vane array and adjacent components of the gas turbine engine may be maintained within design limits, as the gas turbine engine power setting changes.

This may be particularly advantageous if the single-piece annular vane array forms part of a turbine of the gas turbine engine, as component temperatures within the turbine can vary by hundreds of degrees Celsius depending upon whether the gas turbine engine is not operating, operating at low power or operating at high power.

An advantage of a plastically deformable baffle is the baffle, and the single-piece annular vane array comprising the baffle, may deform after the gas turbine engine is accelerated to power, to adopt a required running geometry. In examples in which the gas turbine engine is a single-use gas turbine engine (for example, a gas turbine engine for a missile), a plastically deformable radially inner baffle and/or plastically deformable radially outer baffle may have an additional advantage as it may be lighter than an equivalent elastically deformable radially inner baffle and/or elastically deformable radially outer baffle. This is because it may be designed to operate at higher peak stress levels as the operational life of the single-use gas turbine engine is short (one flight only).

Furthermore, if used in a single-use engine, the single-piece annular vane array is not required to adopt its pre-engine start geometry prior to a subsequent engine restart, making plastic deformation of the array permissible during its first, and only, flight.

The radially inner baffle and/or the radially outer baffle may comprise at least one annular corrugation. The annular corrugation may extend in an axial direction and a radial direction.

The outer mounting feature and/or radially outer baffle may form a portion of a casing of the gas turbine engine.

The above combination of features enables the single piece annular vane array to act as a structural component when installed in a gas turbine engine. For example, the single piece annular vane array may, by locating a bearing of the gas turbine engine, react an axial load acting on the bearing, transmitting this load to the casing of the gas turbine engine, where it may be reacted by an engine mount that is connected to the casing. As the vane array is a single-piece annular vane array, the load path through the array may be mass-optimised. This is because the single-piece annular vane array does not contain internal stress-concentrating features such as arrangements of bolts used to couple adjacent components together.

The ring of stator vanes may comprise a vane inner platform comprising at least one annular projection, having a component that extends in the axial direction.

The ring of stator vanes may additionally comprise a vane outer platform comprising at least one annular projection, having a component that extends in the axial direction.

The at least one annular projection may form a portion of at least one seal between the single-piece annular vane array and an adjacent component of the gas turbine engine when the single-piece annular vane array is comprised within the gas turbine engine.

The radially inner baffle and/or radially outer baffle may comprise at least one aperture.

The at least one aperture may be non-circular.

It may be desirable for the radially inner baffle and/or radially outer baffle to comprise at least one aperture. This is because, when incorporated within a gas turbine engine, the at least one aperture may be comprised within a gas turbine engine air system. The at least one aperture may meter flow within at least a portion of the gas turbine engine air system. The at least one aperture may be non-circular. Non-circular (for example, elliptical) apertures may be desirable, as a discharge coefficient of a non-circular aperture may be higher than a circular aperture. This may permit a smaller aperture to be used, for the same metering flow, relative to a circular aperture.

Optionally, when the single-piece annular vane array is located within a gas turbine engine, the at least one baffle may define a boundary between a first chamber and a second chamber, and the at least one through hole fluidically connecting the first chamber and the second chamber.

The single-piece annular vane array may be manufactured by additive layer manufacturing.

Use of additive layer manufacturing may be desirable as it may permit a reduction in manufacturing cost and/or reduction in manufacturing timescales, relative to more traditional manufacturing techniques, such as casting.

There is additionally provided a method of manufacturing the single-piece annular vane array. The method comprises forming a representation of the single-piece annular vane array by additive layer manufacturing, wherein the representation comprises the structure and a support material that supports the single-piece annular vane array during a build-up of layers of the single-piece annular vane array. The method also comprises finishing the representation of the single-piece annular vane array (by for example, machining), to form the single-piece annular vane array.

In some examples, forming the representation of the single-piece vane array may additionally comprise forming at least one aperture in the radially inner baffle and/or the radially outer baffle of the single-piece annular vane array.

In some examples, the representation of the single-piece annular vane array may comprise stock material. The stock material may be machined to define at least one surface of the inner mounting feature and/or outer mounting feature.

Machining at least one surface of the inner mounting feature and/or outer mounting feature may be desirable for tolerance control reasons, as previously disclosed.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

In the context of this application, a direction that is perpendicular to a rotational axis of a gas turbine engine 10 is referred to as a radial direction.

In the context of this application, "upstream" is interpreted to mean a direction towards the intake 12, while "downstream" is interpreted to mean a direction towards the nozzle 20—i.e., "upstream" is interpreted to mean a direction that is contra to the flow of a working fluid through the primary gas path 25

In the context of this application, the terms "inner" and "outer" mean that an "inner" component is at a reduced radial distance from axis 100, relative to an "outer" component.

In the context of this application, deformation (used with respect to a deformable feature such as a deformable inner and/or radially outer baffle) encompasses elastic deformation, plastic deformation, and a combination of elastic and plastic deformation. In this sense, deformation is meaningful, in that the deformation is on a length scale that is comparable with the dimensions and/or tolerances of an article—i.e., in the context of this disclosure, the term deformable should be interpreted to exclude microscale or nanoscale deformation.

Throughout this specification and in the claims that follow, unless the context requires otherwise, the word "comprise" or variations such as "comprises" and "comprising", will be understood to imply the inclusion of a stated integer or group of integers but not the exclusion of any other stated integer or group of integers.

BRIEF DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
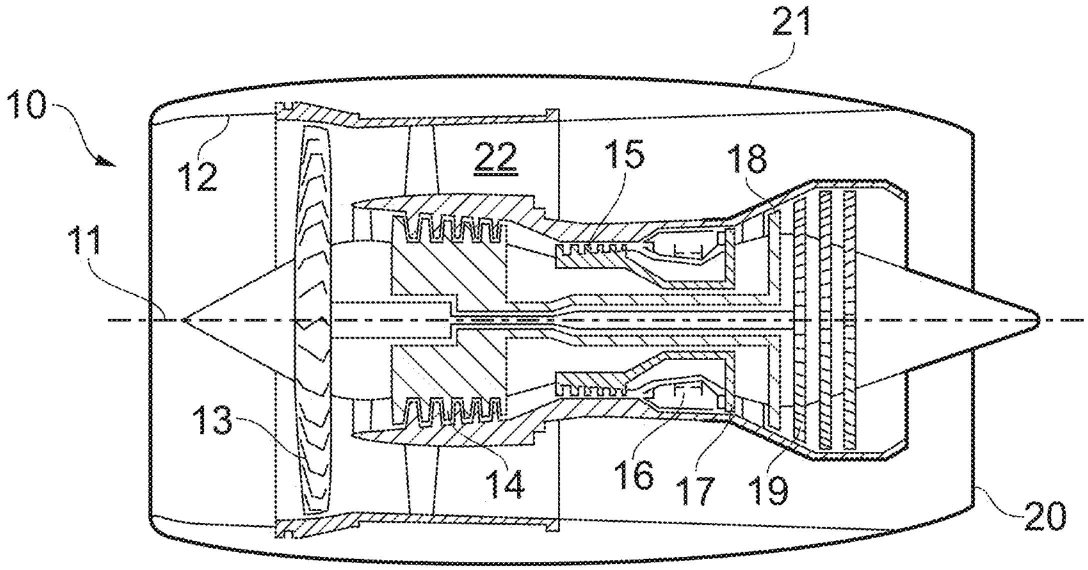
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

The intermediate pressure compressor 14 and high pressure compressor 15 each comprise at least one compressor stage.

The at least one compressor stage of the intermediate pressure compressor 14 comprises a non-rotating set of intermediate compressor stator vanes and an adjacent intermediate pressure compressor rotor comprising intermediate pressure compressor rotor blades. The at least one compressor stage of the high pressure compressor 15 comprises a non-rotating set of high pressure compressor stator vanes and an adjacent high pressure compressor rotor, comprising high pressure compressor rotor blades.

The high pressure turbine 17, intermediate pressure turbine 18 and low pressure turbine 19 comprise at least one turbine stage.

The at least one turbine stage of the high pressure turbine 17 comprises a non-rotating set of high pressure turbine stator vanes and an adjacent high pressure turbine rotor, comprising high pressure turbine rotor blades.

The at least one turbine stage of the intermediate pressure turbine 18 comprises a non-rotating set of intermediate pressure turbine stator vanes and an adjacent intermediate pressure turbine rotor, comprising intermediate pressure turbine rotor blades.

The at least one turbine stage of the low pressure turbine 19 comprises a non-rotating set of low pressure turbine stator vanes and an adjacent low pressure turbine rotor, comprising low pressure turbine rotor blades.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Gas turbine engines such as that illustrated in FIG. 1 typically include at least one structural component that locates other components of the gas turbine engine relative to each other and/or transmits mechanical load between portions of the gas turbine engine.

For example, it will be appreciated that a gas turbine engine comprises at least one structural component that locates the stator vanes of a compressor stage relative to the rotor and rotor blades of the compressor stage and/or locates the stator vanes of a turbine stage to the rotor and rotor blades of the turbine stage.

Figure 2:
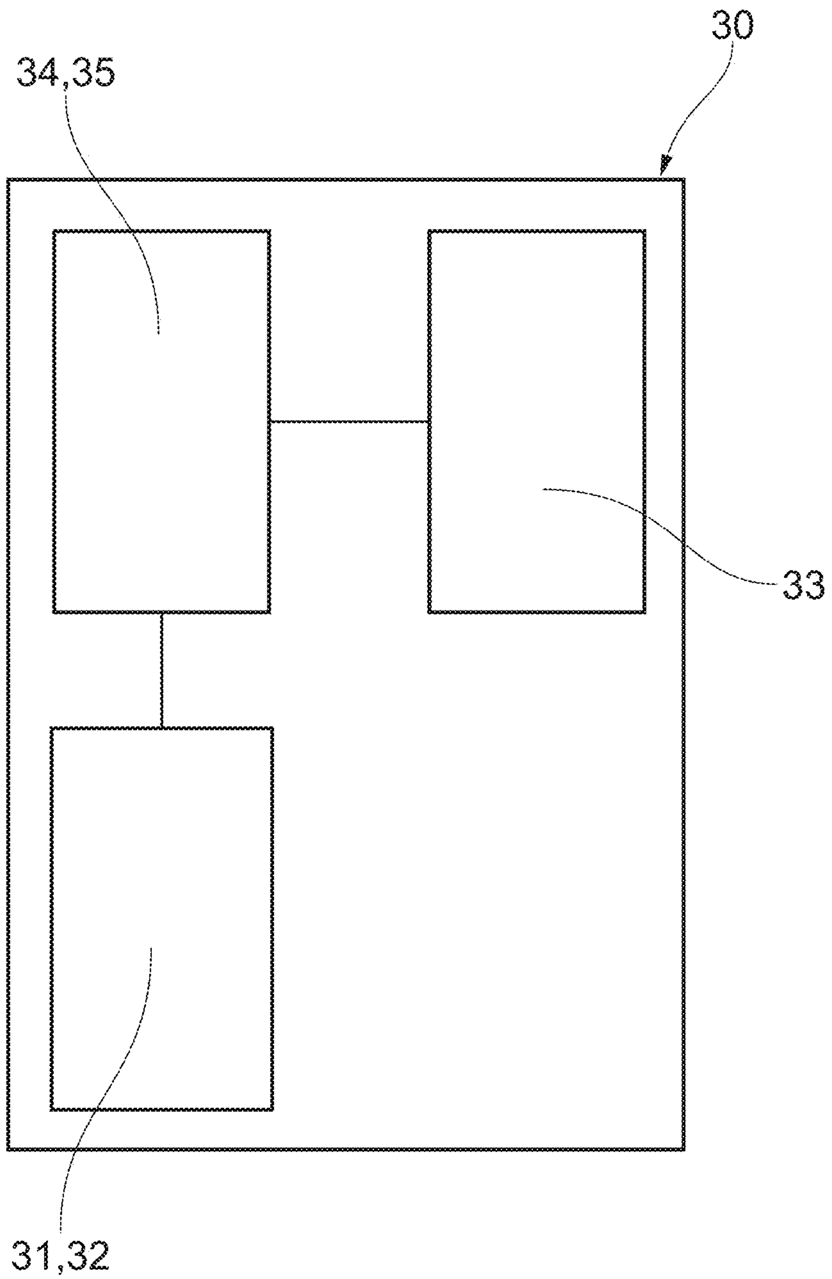
FIG. 2 is a schematic representation of a single-piece annular vane array.

FIG. 2 provides a schematic representation of a single piece annular vane array 30.

The single-piece annular vane array 30 of FIG. 2 comprises: at least one mounting feature 31, 32; a ring of stator vanes 33; and at least one baffle 34,35, attached at a first radial location to the ring of stator vanes 33, and attached at a second radial location to the at least one mounting feature 31,32.

The single-piece annular vane array 30 may locate the stator vanes of a turbomachinery stage (compressor stage or turbine stage) relative to the rotor and rotor blades of the turbomachinery stage. The single-piece annular vane array 30 may be a structural component of the gas turbine engine 10.

Depending upon the location of the single-piece annular vane array 30 within the gas turbine engine, the ring of stator vanes 33 that are located may be turbine stator vanes (of the high pressure turbine, intermediate pressure turbine and/or low pressure turbine) or compressor stator vanes (of the intermediate pressure compressor and/or high pressure compressor).

As the vane array of FIG. 2 is a single-piece annular vane array, it does not comprise multiple sub-structures that are joined together by mechanical interfaces, thereby overcoming the disadvantages that these mechanical interfaces may introduce.

Figure 3:
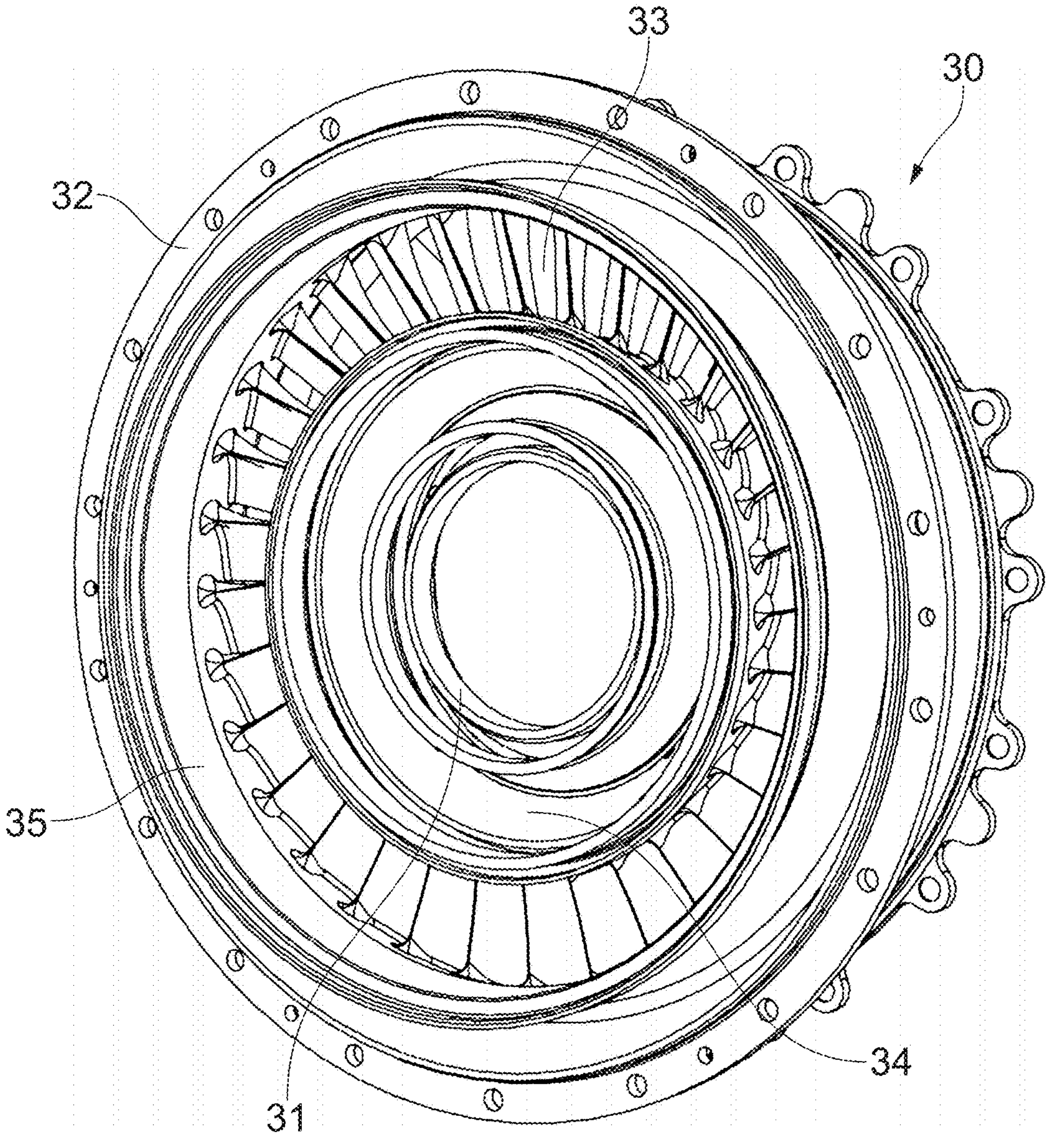
FIG. 3 is a three-dimensional perspective view of an example of a single-piece annular vane array.

FIG. 3 provides a three dimensional perspective view of an example of the single-piece annular vane array, In the example of FIG. 3, the single-piece annular vane array is located within the turbine of the gas turbine engine 10. As is subsequently disclosed in more detail, it therefore comprises a radially inner baffle 34 and a radially outer baffle 35, both of which are configured to accommodate thermally-derived stresses.

Figure 4:
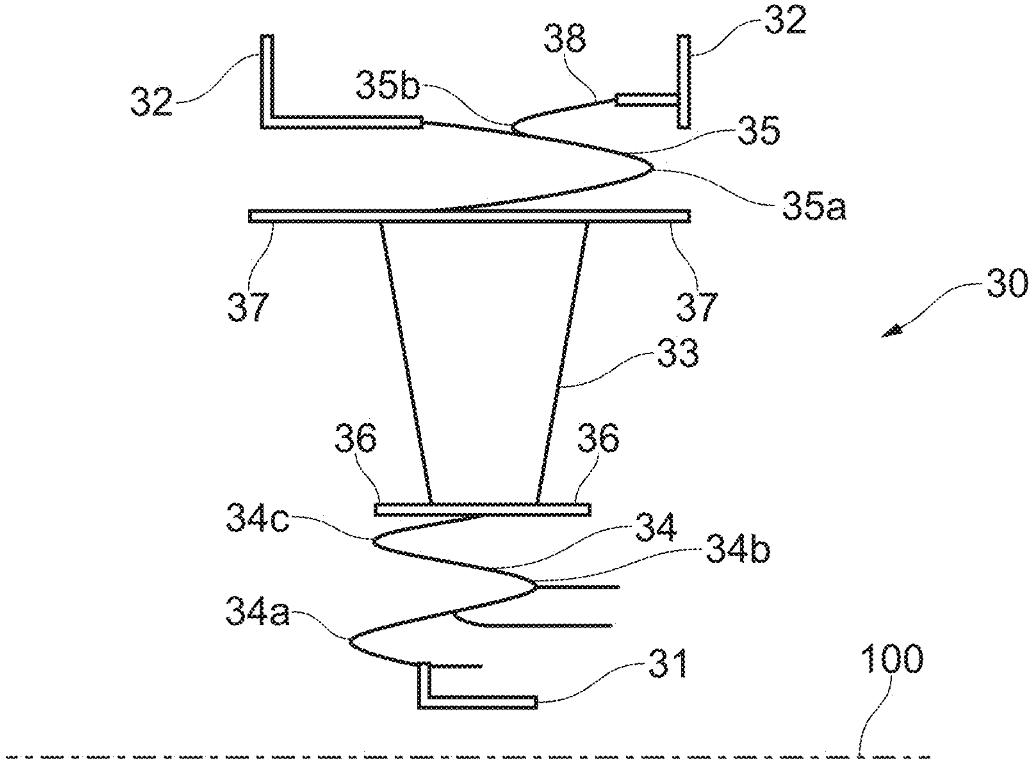
FIG. 4 is an example of an axial cross-section of a single-piece annular vane array for a gas turbine.

FIG. 4 provides a related axial cross-section of the vane array 30 of FIG. 3, shown in schematic form.

Figure 5:
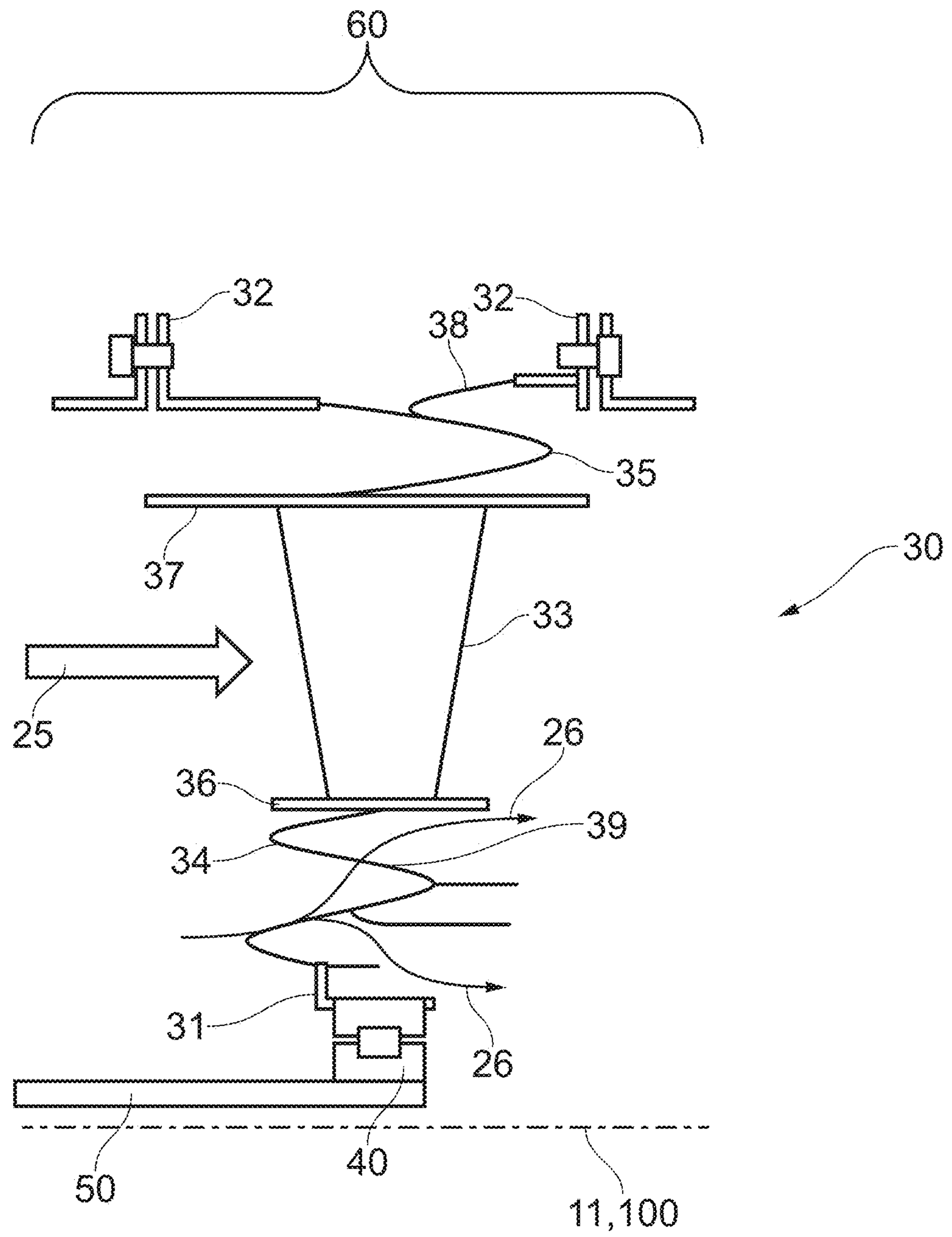
FIG. 5 is an example of a single-piece annular vane array for a gas turbine, when comprised within a gas turbine.

FIG. 5 provides a related axial cross-section of the vane array 30 of FIG. 4, in which the vane array 30 is comprised within a turbine of a gas turbine engine 10. When comprised within a gas turbine engine, the axis 100 of the single-piece annular vane array 30 is coaxial with the principal and rotational axis 11 of the gas turbine engine.

In the example illustrated by FIGS. 4 and 5: the at least one mounting feature is an inner mounting feature 31 and an outer mounting feature 32; and the at least one baffle comprises a radially inner baffle 34, attached at its outer radius to the ring of stator vanes 33 and attached at its outer radius to the inner mounting feature 31. The at least one baffle comprises a radially outer baffle 35, attached at its inner radius to the ring of stator vanes 33, and attached at its outer radius to the outer mounting feature 32

In some examples, the inner mounting feature 31 may be configured to mount (i.e., locate) a bearing 40 for a gas turbine engine shaft 50 (see FIG. 5).

As illustrated in FIG. 5, the outer mounting feature 32 may connect the structure 30 to components which form part of a casing 60 of a gas turbine engine 10.

Thus, forces such as bearing loads, may be reacted by the inner mounting feature 31 and transmitted through the single-piece annular vane array 30 to the outer mounting feature 32, and onwardly transmitted to an engine mounting feature such as an engine pylon, via the casing of the gas turbine engine 60.

In some examples, a portion of the single-piece annular vane array 30 may also form part of the casing 60 of the gas turbine engine 10.

The ring of stator vanes 33 comprises a plurality of stator vanes (for example, turbine stator vanes or compressor stator vanes), mechanically coupled to a vane inner platform 36 and a vane outer platform 37, as is known in the art. The vane inner platform 36 and vane outer platform 37 also extend circumferentially around axis 100 to form respective annular inner and outer rings.

The plurality of stator vanes may be monolithic (solid). Alternatively, the vanes of the plurality of stator vanes may comprise a hollow core.

The single-piece annular vane array 30 may be configured to accommodate temperature changes generated by a change in power setting of the gas turbine engine 10. To accommodate these changes, at least one of the radially inner baffle 34 and/or the radially outer baffle 35 may be deformable.

The radially inner baffle may be elastically deformable and/or plastically deformable.

Similarly, the radially outer baffle may elastically deformable and/or plastically deformable.

By controlling the deformation of the radially inner baffle 34 and/or the radially outer baffle 35 in response to a change in engine power setting, relative movement of the structure 30 to an adjacent rotor may also be controlled.

The shape of the radially inner baffle 34 and/or the shape of the radially outer baffle 35 may be such that axial movement of the ring of stator vanes 33 of the single-piece annular vane array 30 along the centre line 11 of the gas turbine may be reduced, whereas radial growth and/or contraction of the ring of stator vanes 33 may be permitted.

For structures for a gas turbine comprising materials with a positive coefficient of thermal expansion, radial growth of the ring of stator vanes 33 occurs due to an increase in temperature of the structure 30 caused by an increase in engine power setting, while radial contraction of the ring of stator vanes 33 occurs due to a decrease in temperature of the structure caused by a decrease in engine power setting.

Deformation of the radially inner baffle 34 and/or radially outer baffle 35 may also reduce thermally-generated stresses within the single-piece circumferential structure 30 caused by the engine power setting or change in engine power setting. Reducing the thermally-generated stress may increase the fatigue life of the single-piece annular vane array 30.

Radial movement of the ring of stator vanes 33 may be dependent at least in part on a stiffness of the deformable radially inner baffle 34 and/or on a stiffness of the deformable radially outer baffle 35.

In some examples, the radially inner baffle 34 and/or radially outer baffle 35 may have reduced stiffness in the radial direction relative to radial stiffness of the ring of stator vanes 33.

As illustrated in the cross-section of FIGS. 4 and 5, the radially inner baffle 34 and the radially outer baffle 35 are not planar, but instead comprise at least one reverse-bend 34*a*, 34*b*, 34*c*, 35*a*, 35*b*. The at least one reverse bend 34*a*, 34*b*, 34*c* of the radially inner baffle 34, and the at least one reverse bend 35*a*, 35*b* of the radially outer baffle 35 extend in a first direction and a second direction that is perpendicular to the first direction.

Other possibilities are also envisaged. For example, in some examples, one of the radially outer baffle 35 and the radially inner baffle 34 may be planar, while the other baffle may comprise at least one reverse bend. In these examples, the planar baffle may have a greater radial stiffness but a lower radial stiffness than the baffle comprising the at least one reverse bend.

In the examples of FIGS. 2 to 5, the first direction is an axial direction, and the second direction is a radial direction. In the examples of FIGS. 2 to 5, as the structure extends in a radial direction away from axis 100, the extension of the reverse bends in an axial direction may switch between a positive and a negative axial direction.

In the examples of FIGS. 2 to 5, the reverse bends 34*a*, 34*b*, 34*c*, of the radially inner baffle 34 and the reverse bends 35*a*, 35*b* of the radially outer baffle 35 are annular, extending circumferentially about axis 100 of the single-piece annular vane array 30.

In the examples of FIGS. 2 to 5, as the radially outer baffle comprises reverse bends, the radially outer baffle is deformable. Similarly, as the radially inner baffle of FIGS. 2 to 5 comprises reverse bends, the radially inner baffle is deformable.

As the reverse bends are annular, the radially inner baffle 34 comprises at least one annular corrugation and the radially outer baffle 35 comprises at least one annular corrugation. The at least one annular corrugation of the deformable radially inner baffle 34 and the at least one annular corrugation of the deformable radially outer baffle 35 are concentric about axis 100 of the single-piece annular vane array 30.

The at least one annular corrugations of the deformable radially inner baffle 34 and/or deformable radially outer baffle 35 reduce the stiffness of the radially inner baffle 34 and radially outer baffle 35 in the radial direction.

The deformable radially inner baffle 34 and/or deformable radially outer baffle 35 may comprise different numbers of annular corrugations without departing from the spirit of the present disclosure.

The ratio of the axial stiffness to radial stiffness of the radially outer baffle 35, and/or the ratio of the axial stiffness to radial stiffness of the radially inner baffle 34 may be based at least in part on the geometry (shape) of the respective reverse bends 34*a*, 34*b*, 34*c*, 35*a*, 35*b*.

Figure 6A:
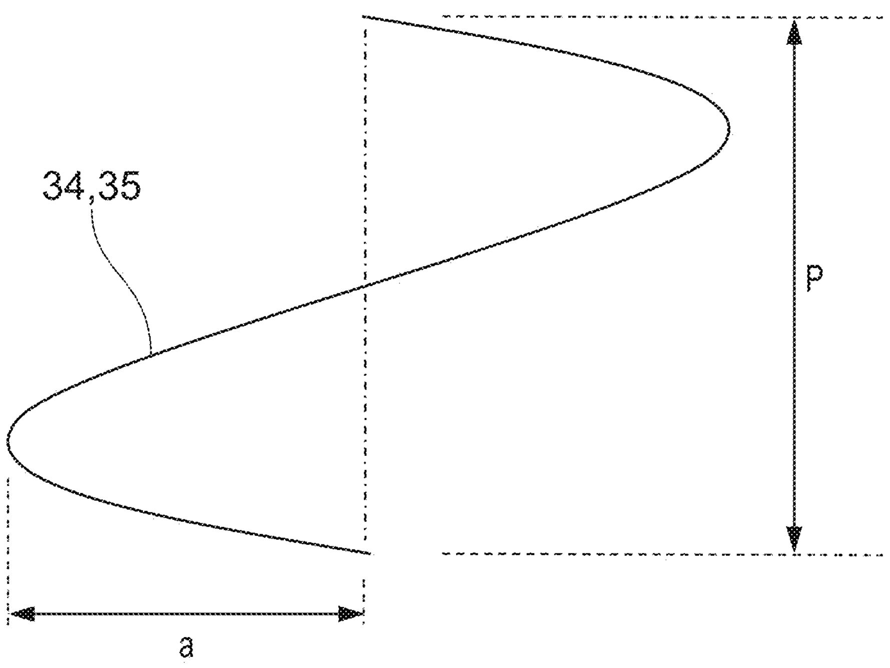
FIG. 6A is an example reverse loop of a single-piece annular vane array for a gas turbine.
Figure 6B:
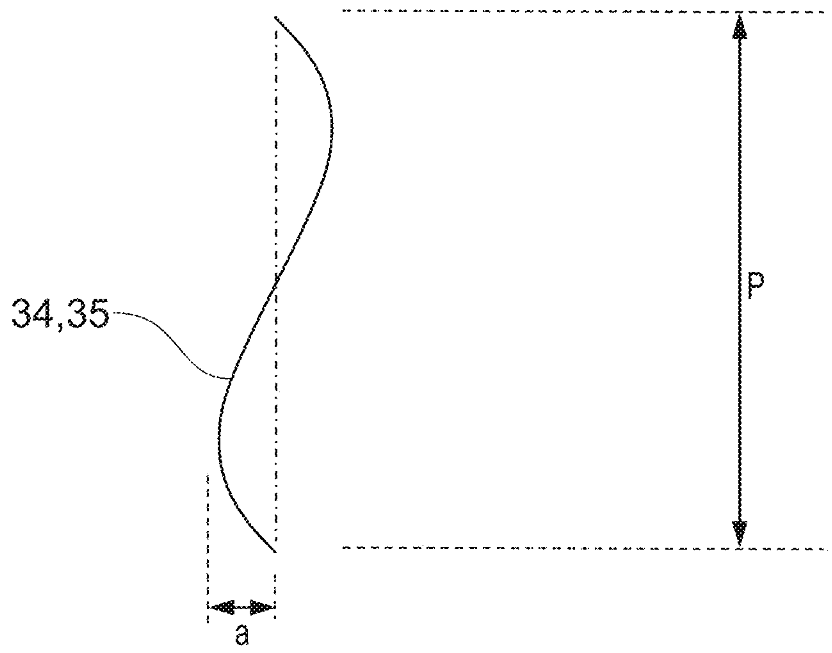
FIG. 6B is an example reverse loop of a single-piece annular vane array for a gas turbine.

The stiffness in the radial direction and the stiffness in the axial direction may be based at least in part on the ratio of the amplitude a of the reverse bend to the pitch p of the reverse bend. FIGS. 6A and 6B provide examples of reverse bends having different ratios of a:p.

In the examples illustrated by FIGS. 6A and 6B, the example reverse bend of FIG. 6A has a higher ratio of a:p than the example of FIG. 6B. In these examples, the reverse bend of FIG. 6A has a lower radial stiffness than the reverse bend of FIG. 6B but may also have a higher axial stiffness than the reverse bend of FIG. 6B.

The stiffness in the radial and axial directions for the deformable radially outer baffle 35 may also be varied by altering at least one of the curvature of the reverse-bend (corrugation), the thickness of the cross-section of the reverse-bend and/or the number of reverse-bends.

The reverse bends of the radially outer deformable baffle 35 and/or radially inner deformable baffle 34 may be configured such that for a given radial deformation (for example, due to thermal expansion) a proportionate axial deformation will occur.

The magnitude of the radial deformation may be different to the magnitude of axial deformation.

This may assist in matching and/or compensating for thermally-derived deformation between the single-piece annular vane array and adjacent components in the radial and axial directions. This may also assist in maintaining seal clearances between the structure 30 and adjacent components.

The ring of stator vanes 33 may have a greater radial stiffness than the radial stiffness of either the deformable radially inner baffle 34 or the deformable radially outer baffle 35.

Deformation of the deformable radially inner baffle 34 and/or deformable radially outer baffle 35 may reduce thermally-derived stresses that are at or proximal to the interface between the ring of stator vanes 33 and the deformable radially inner baffle or deformable radially outer baffle.

The desired magnitude of the required radial stiffness and/or axial stiffness of the single-piece annular vane array 30 may be determined by consideration of how the loads transmitted through the single-piece annular vane from one portion of the gas turbine engine 10 to another portion of the gas turbine engine are generated, and where the single-piece annular vane array 30, when installed within a gas turbine engine 10.

FIGS. 2 to 5 also illustrate that in some examples, radially outer baffle 35 may comprise at least one secondary corrugation 38. The at least one secondary corrugation 38 may be mechanically connected proximal to a reverse bend of the deformable radially outer baffle 35 and may extend in an opposing axial direction to the reverse bend, as the reverse bend and secondary corrugation extend radially away from centreline 100. The at least one secondary corrugation 38 may be annular. The at least one secondary corrugation 38 may be mechanically connected to outer mounting feature 32.

The combination of the at least one reverse bend and the secondary corrugation of the radially outer baffle 35 may be configured to control the relative axial stiffness and radial stiffness of the radially outer baffle 35, and as a consequence, the relative axial stiffness and radial stiffness of the array 30. Relative to examples in which the secondary corrugation is not present (not shown), inclusion of the secondary corrugation may increase the ratio of the axial stiffness of the radially outer baffle 35 to the radial stiffness of the radially outer baffle 35.

In some but not necessarily all embodiments, at least one of the outer mounting feature 32, radially outer baffle 35 and/or secondary corrugation of the radially outer baffle 35 may form part of a casing 60 of a gas turbine engine 10 when the single-piece annular vane array 30 is comprised within the gas turbine engine 10.

The functioning of the single-piece annular vane array 30 when comprised within a gas turbine engine 10 is now disclosed in more detail, by reference to FIG. 5.

In the example of FIG. 5, the single-piece annular vane array 30 is comprised within a turbine 17, 18, 19, the single-piece annular vane array 30 locating at least one bearing 40 at its inner mounting feature 31. The at least one bearing 40 supports a shaft 50 that interconnects the turbine with its respective compressor.

The single-piece annular vane array 30 for a gas turbine engine also locates the ring of stator vanes 33 comprised within the array 30 relative to adjacent engine components such as an upstream turbine rotor (not shown in FIG. 5), or a downstream turbine rotor (not shown in FIG. 5). The single-piece annular vane array 30 for a gas turbine may react loads acting on components of the gas turbine engine to which the single piece annular vane array 30 for a gas turbine engine it is mechanically coupled. For example, the single-piece annular vane array 30 may react loads acting on the at least one bearing 40.

It will be appreciated that as a working fluid, such as air is compressed, combusted and the resulting combustion gases expanded through the primary gas path 25 of the gas turbine engine, the static pressure acting at successive planes of the gas turbine engine 10 that are perpendicular to the principal and rotational axis 11 of the gas turbine engine (and axis 100 of the single-piece annular vane array 30) changes. Consequently, when the gas turbine engine is operated, a net axial force, generated by these changing pressures, may act on shaft 50 that interconnects a compressor and its associated turbine.

To prevent axial movement of the shaft 50, the axial force may be reacted at the bearing 40 supporting the shaft 50, the forces acting on the bearing being in turn reacted by the single-piece annular vane array 30 that locates the bearing 40. This structure may in turn transmit these forces to casing 60 or other portions of the casing 60 of the gas turbine engine 10, and ultimately to an engine mounting arrangement, such as an engine pylon that is mechanically connected to the casing 60.

It will be appreciated that the capability of the located bearing 40 to react a load is determined by the bearing type and size. For example, an axial load, acting along axis 11, may be reacted by a ball bearing (thrust bearing), whereas a roller bearing, rotating about rotational axis 11 may have less capability to react an axial load.

Not all single-piece annular vane arrays 30 for a gas turbine engine 10 may be required to react an axial bearing load, as for example, in some gas turbine engine designs, a ball bearing is supported by a structure that supports the compressor. In these engines, a structure, such as single-piece annular vane array, that supports the associated interconnected turbine may therefore not be required to react an axial load.

Alternatively, in gas turbine engine designs that comprise a thrust bearing supported by a structure such as a single-piece annular vane array, a structure that supports the associated interconnected compressor may not be required to support an axial load.

It will be appreciated that the required axial stiffness of the single-piece annular vane array 30 may be based at least in part on whether the vane array supports a thrust bearing, such as a ball bearing, or whether the structure supports an alternative bearing type, such as a roller bearing, which may not be configured to support an axial load.

It will be appreciated that a single-piece vane annular array for a gas turbine engine that supports a bearing (for example, a ball bearing or roller bearing) may additionally resist movement of the shaft away from the rotational axis 11 of the engine 10. For example, the single-piece annular vane array may resist radial movement of the bearing and shaft caused by forces generated by the rotation of an unbalanced compressor, turbine and shaft assembly.

The required radial stiffness of the structure 30 may be determined based at least in part on a rotor-dynamic analysis of the gas turbine engine 10. In other words, the rotor-dynamic analysis determines at least one radial vibrational frequency or at least one range of vibrational radial frequencies (for example, a frequency or frequencies relating to shaft whirl) that are to be avoided. The radial stiffness of structure 30 may be then set so as to not coincide with these frequencies. The radial stiffness of the structure 30 may be based at least in part on a radial stiffness of the radially outer baffle 35 and/or radially inner baffle 34.

The single-piece annular vane array for a gas turbine engine may be configured to additionally control thermally-derived movements of components of the gas turbine engine and/or accommodate thermally-derived stresses.

To maintain efficient and safe operation of the gas turbine engine over a range of different power settings (i.e., different engine thrusts for an aero gas turbine engine), it may be desirable to control the relative displacement (movement) of adjacent gas turbine engine components such that these movements, and related gaps between adjacent gas turbine engine components, remain within design specification.

For example, it may be desirable to control the relative axial movement and/or radial movement between a static set of turbine vanes and a respective adjacent turbine rotor. Similarly, it may be desirable to control the relative axial movement and/or radial movement between a static set of compressor vanes, and a respective adjacent compressor rotor.

Controlling movement may be desirable as this may reduce the risk of higher temperature fluid from the primary gas path 25 of the gas turbine engine being ingested through a gap (if present) between adjacent static and rotating engine components. For example, the risk of high temperature combustor exhaust gas being ingested through a gap between the stator vanes and rotor of the high pressure turbine 17 may be reduced, in turn reducing the risk of the material of high pressure turbine rotor overheating.

Controlling such movement can be challenging when changing a power setting, such as an engine thrust setting because the change in power setting changes the temperature of the gas turbine engine components. The change in temperature of the gas turbine components may also differ between components, for the same change in power setting.

As the materials from which the gas turbine engine components are manufactured typically have non-zero coefficients of thermal expansion, differential movement may occur between components of the gas turbine engine due to the change in gas turbine engine component temperature caused by the change in engine power setting.

Furthermore, as different portions of a single-piece annular vane array 30 for a gas turbine engine 10 may change temperature by different amounts for the same change in engine power setting, changes in engine power setting may additionally create thermally-derived stresses within the single-piece annular vane array. For example, portions of the single-piece annular vane array 30 that are exposed to the primary gas path 25 may change temperature by larger amounts than portions of the single-piece annular vane array 30 that are not exposed to the primary gas path 25.

This is particularly the case if the single-piece annular vane array is located within the turbine of a gas turbine engine, as larger changes in temperature of the primary gas path may occur within the turbine, than within the compressor of the gas turbine engine.

Thermal cycling caused by repeated changes in engine power setting may limit the life of the single-piece annular vane array 30, such that the single-piece annular vane array 30 is removed or replaced before it is predicted to fail, due to thermal fatigue.

By comprising reverse bends, the radially inner baffle 34 and/or radially outer baffle 35 of the single-piece annular vane array 30 are configured to accommodate thermally-derived stresses caused by the operation of the gas turbine engine 10.

This is because by controlling the radial and/or axial stiffness of the radially inner baffle 34 and radially outer baffle 35, when comprised within a gas turbine engine 10, gaps between the vane array 30 and adjacent gas turbine engine components may be controlled and an acceptable thermal fatigue life obtained, despite thermal cycling of the engine due to engine power setting changes.

Similarly, by suitable selection of the dimensions of the reverse bends (for example, shape, thickness), it is possible to control the thermal growth of the single-piece annular vane array 30 under transient engine conditions (caused by changes in engine power setting), such that gaps and/or clearances between the single-piece annular vane array 30 and adjacent components, are maintained within design limits. For example, in this way a seal clearance between the single-piece annular van array 30 and an adjacent turbomachinery rotor disc may be maintained.

This approach (use of reverse bends) is an alternative to traditional gas turbine engine design techniques which form complex structures which comprise a plurality of simpler sub-structures, joined at a plurality of mechanical interfaces by mechanical fixings such as arrangements of bolts.

The use of mechanical interfaces and mechanical fixings to join adjacent sub-structures has a number of disadvantages.

For example, use of an arrangement of bolts may require a local increase in thickness of portions of adjacent sub-structures which form the associated mechanical interface if acceptable mechanical stresses in the vicinity of an arrangement of bolts are to be obtained. This increase the mass of the resulting structure, which is undesirable if the gas turbine comprising the structure is used in aerospace applications.

Furthermore, tool access is required to join (for example, bolt together) the sub-structures which comprise the complex structure, thus complicating assembly and disassembly of the structure and/or gas turbine engine comprising the structure.

Tolerance control and tolerance stack-up control is also complicated by the presence of the mechanical interfaces within the structure, as the number of mechanical interfaces to account for is increased.

The single-piece annular vane assembly of the present disclosure overcomes these disadvantages, because it does not comprise a plurality of sub-structures, joined at mechanical interfaces.

With reference to FIG. 5, some optional features of the single-piece annular vane array 30 are now disclosed.

Optionally, the radially inner baffle 34 and/or radially outer baffle 35 of the single-piece annular vane array 30 may comprise at least one aperture 39.

The at least one aperture 39 may form part of a gas turbine engine air system, when the structure 30 is comprised within a gas turbine engine 10. In the illustrative example of FIG. 5, only the radially inner baffle 34 comprises at least one aperture 39.

When comprised within a gas turbine engine, the radially inner baffle 34 and/or radially outer baffle 35 may divide a volume of the gas turbine engine into separate chambers. For example, the radially inner baffle 34 may divide a first volume into a first upstream chamber, and first downstream chamber. Similarly, the radially outer baffle 35 may divide a second volume into a second upstream chamber and a second downstream chamber.

The at least one aperture 39 of the baffle 34, 35 may be configured to control a flow 26 of working fluid (for example, air) within a chamber on one side of the baffle 34,35 that is at a higher pressure, to flow to a chamber on an opposing side of the baffle 34, 35 that is at a lower pressure.

By controlling a geometry of the at least one aperture 39, the flow 26 of gas between chambers on opposing sides of the baffle 34, 35 may be controlled. A pressure differential across the baffle 34, 35 may also be controlled. This may assist in bearing load management.

The shape of the perimeter of the at least one aperture 39 may be circular or non-circular. The perimeter of the at least one aperture 39 may be elliptical.

In some examples, an axis of the aperture 39 may be aligned such that it is parallel with axis 100. In other examples, the axis of the aperture may not be parallel with axis 100.

In some examples, the localised thickness of the baffle in which the aperture is located may be greater than other portions of the baffle in which an aperture is not located. For example, a protrusion may be present on a surface of the baffle through which the aperture passes.

This localised thickening elongates the length of the aperture. In these examples, the cross-sectional area of the aperture may also vary along the length of the aperture. For example, the aperture may have a converging-diverging profile along its length, such that it may act as a venturi in a gas turbine engine air system.

In examples in which the length of the aperture is elongated, the axis of the aperture may be linear. In other examples, the axis of the aperture may instead be curved. In these examples, the entry angle of flow into the aperture may differ from the exit angle of air flow out of the aperture. The aperture may thus redirect the air flow as it passes through the aperture. This may be beneficial if a chamber that is fluidically connected by the aperture comprises an airflow that swirls around axis 100, and it is desirable to align the aperture to the localised air swirl.

An advantage of a non-circular perimeter and/or elongated length and/or converging-diverging profile along its length of the at least one aperture 39 is that the at least one aperture 39 may have a discharge coefficient that is optimised for the gas turbine engine air system. For example, the at least one aperture 39 may have a discharge coefficient that is greater than the discharge coefficient of a circular aperture. This provides a designer of the gas turbine engine 10 with a greater degree of design freedom, as it may permit a higher flow of a working fluid through a smaller non-circular aperture than is possible for a circular aperture, for the same pressure differential across the apertures.

Optionally, the vane inner platform 36 may comprise a circumferentially-extending (annular) projection that extends in an upstream direction from the stator vanes, and/or extends in a downstream direction from the stator vanes.

Optionally, the vane outer platform 37 may comprise a circumferentially-extending (annular) projection that extends in an upstream direction from the stator vanes, and/or extends in a downstream direction from the stator vanes.

A surface of the annular projection of the vane inner platform 36 or vane outer platform 37, may extend in an axial direction at a decreasing radius, constant radius or increasing radius as it extends from the stator vanes. The surface of the annular projection may be cylindrical, frusto-conical or curved.

In some but not necessarily all examples, an annular projection 36 of the vane inner platform may be configured to form part of a seal (not shown) between the single-piece annular vane array 30 and an adjacent rotating component such as a turbine rotor or compressor rotor.

In some examples, a honeycomb structure and/or abradable material may be attached to a radially inboard surface of the annular projection to form an abradable seal surface, as part of a knife edge seal.

Optionally, in examples in which the single-piece annular vane array is manufactured by an additive layer manufacturing method, the honeycomb structure may be formed as part of the single-piece annular vane array.

Optionally, in some examples, the annular projection may define a gap between the single-piece annular vane array 30 and an adjacent rotating component such as a turbine rotor. When comprised within a gas turbine engine 10, air supplied by the internal air-system of the gas turbine engine, may be discharged through this gap from a chamber in the vicinity of the radially inner baffle into the main gas path through the gas turbine to prevent or mitigate against the risk of ingestion of gas from the main gas path into the chamber.

In other examples in which the single-piece circumferential structure is adjoining a static engine structure, the projection may be an interface between the single-piece annular vane array and the adjoining static structure. In these examples, the projection may form a birdsmouth joint or a bellmouth joint with the adjoining engine structure. This may simplify assembly of the single-piece circumferentially structure within the gas turbine engine as the projection may circumferentially align the single-piece annular vane array relative to the adjoining static structure.

Optionally, and as illustrated in FIG. 5, the outer mounting feature 32 and the radially outer baffle 35 may form part of the engine casing 60.

The single-piece annular vane array 30 may be manufactured by a variety of methods.

For example, the single-piece annular vane array 30 may be manufactured by at least one of casting, forging, milling or turning.

Alternatively or additionally, the single-piece annular vane array 30 may be at least in part manufactured by an additive layer manufacturing (ALM) method.

Additive Layer Manufacturing involves building a three-dimensional object from a computer-aided design (CAD) model, usually by successively adding material layer by layer. This is in contrast to conventional machining, casting and forging processes, where material is removed from a stock item (subtractive manufacturing) or poured into a mold and shaped by means of dies, presses and hammers.

The additive layer manufacturing (ALM) method may be a powder bed fusion method such as laser powder bed fusion or electron beam powder bed fusion.

The additive layer manufacturing method may be a directed energy deposition method. The directed energy deposition method may utilise blown powder and/or wire arc.

The powder may be a metallic powder or a ceramic powder.

The wire may be a metallic wire.

The metallic powder and/or wire may be one of Haynes 282, Inconel 718, Inconel 738, Stainless Steel, Titanium 6-4, ABD 900 AM, MAR-M-002.

The above materials are suitable for use in a high temperature environment such as within a turbine of a gas turbine engine 10.

In embodiments in which the single-piece annular vane array 30 is comprised within a lower temperature environment, such as the initial compressor stages of a compressor of a gas turbine engine, the single-piece annular vane array may comprise alternative materials, with a lower temperature capability. Example materials include polyetheretherketone (PEEK) and polyetherketoneketone (PEKK).

Use of ALM may have the advantage of permitting rapid manufacture of the single-piece annular vane array. This may be particularly advantageous relative to the use of conventional casting techniques, in which lead-times for procuring castings may be significantly greater than that required for manufacture by ALM.

Use of ALM may also have the advantage that non-circular apertures 39 may be formed directly.

Optionally, additional finishing manufacturing techniques may be used to produce the finished structure 30, prior to assembly within the gas turbine engine 10.

Examples of finishing manufacturing techniques comprise milling, laser drilling, ceramic coating, deburring, sand blasting, shot peening and/or electro discharge machining (EDM).

Hand finishing manufacturing methods involving the use of hand tools by a user may additionally or alternatively be utilised Due to the complex shape of the single-piece annular vane array, when formed by ALM, the single-piece annular vane array may additionally comprise at least one support structure 70, the at least one support structure supporting at least one portion of the single-piece annular vane array 30 in its desired orientation and relative position, whilst fusing of the successive layers 75 of the single-piece annular vane array 30 is ongoing. Whilst fusing the successive layers 75, the shape formed by ALM is therefore a representation of the single-piece annular vane array 30, but additionally comprises the at least one support structure 70.

Figure 7:
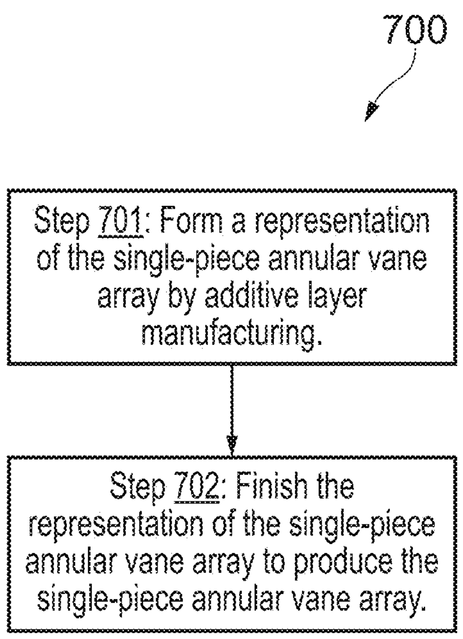
FIG. 7 provides an example method of manufacture of a single-piece annular vane array.

As illustrated in FIG. 7, a method 700 of forming the single-piece annular vane array 30, may therefore comprise at least one step (step 701 and optional step 702): Step 701: Forming a representation of the single-piece annular vane array 30 by additive layer manufacturing; and Step 702: Finishing the representation of the single-piece annular vane array 30.

Concerning step 701, the representation of the single-piece annular vane array 80 may not have an identical shape to the single-piece annular vane array 30.

For example, the representation of the single-piece annular vane array may additionally comprise projections extending from material that may become an outer surface of the single-piece annular vane array. These projections may be machining stock, for subsequent removal (see step 702) or may be support structure 70, extending towards a bed of the ALM machine, and used to support portions of the representation of the single-piece annular vane array as it is constructed from a series of layers 75, successively deposited adjacent to each other.

If the shape of the representation of the single-piece annular vane array formed in step 701 is identical to the shape of the single-piece annular vane array, then step 702 is not required.

If the shapes are different, then step 702 is performed to finish the representation of the single-piece annular vane array to produce the single-piece annular vane array.

In optional step 702, machining processes such as milling may also optionally be used to finish-machine features of the single-piece annular vane array. For example, a surface of the inner mounting feature and/or outer mounting feature may be machined to provide an improved surface finish (reduced level of surface undulation) and/or to geometrically define a mechanical interface of the single-piece annular vane array such as a face of the inner mounting feature and/or outer mounting feature that interfaces within an adjacent component of the gas turbine engine. Alternatively or additionally, hand-finishing processes may also be used.

In optional step 702, features of the single-piece annular vane array which form a mechanical interface of the finished structure may be formed by ALM to comprise machining stock, that is partially removed by subsequent machining to form the required interface. In this way, the geometric tolerance on the location and/or orientation of an interface of may be improved. This may be beneficial in reducing a scrap-rate of components during manufacture.

The interfaces may be with adjacent static components, or with rotating components.

For example, machining stock may be provided on the outer mounting feature, the inner mounting feature, and optionally, to the extension. In some but not necessarily all embodiments, the inner mounting feature may be machined to form an outer race for a bearing or an interface with an outer race for a bearing.

Figure 8:
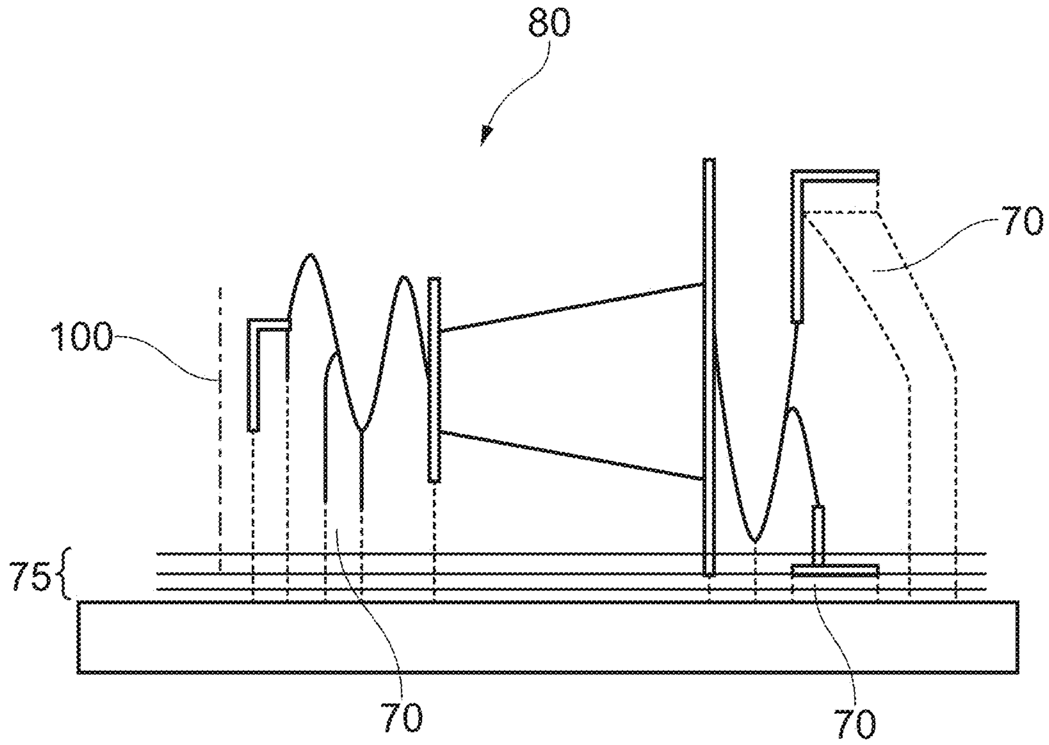
FIG. 8 provides an example representation of a single-piece annular vane array for a gas turbine that comprises a support structure, when formed by additive layer manufacturing.

FIG. 8 provides an example cross-section of the representation of the single-piece annular vane array.

Figure 9:
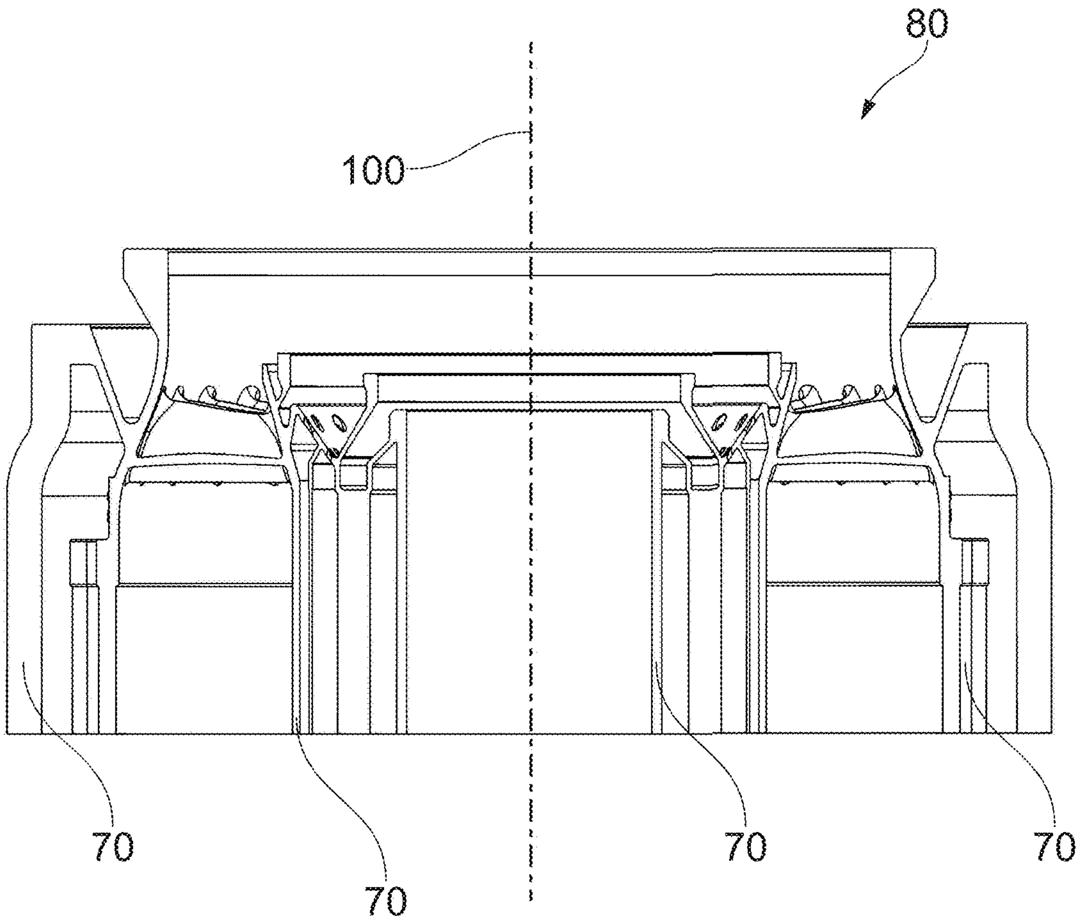
FIG. 9 provides a three-dimensional cross-sectional view of an example representation of a single-piece annular vane array.

FIG. 9 provides a three-dimensional perspective view of the representation of the single-piece annular vane array.

In the example provided in FIGS. 8 and 9, a plurality of support structures 70 are shown. FIG. 7 illustrates how the representation of the single piece annular vane array 80 is constructed from a series of layers 75 successively deposited adjacent to each other. As the structure 30 is circumferentially-extending around axis 100, it will be appreciated that the support structures so formed comprise a plurality of rings of support structure 70, centered around axis 100 (see FIG. 9).

The differences in shape between the single piece annular vane array 30 and the representation of the single-piece annular vane array 80 are readily apparent, by comparing FIG. 4 with FIG. 8, and FIG. 3 with FIG. 9.

An advantage of using ALM to form the single-piece annular vane array 30 is that the support structure 70 is typically located away from more intricate portions of the vane array, such as the ring of stator vanes. Support structure 70 may therefore be easily removed from the representation of the single-piece annular vane array 80 at step 702, without risking damage to the stator vanes.

It will be understood that the invention is not limited to the examples above-described and various modifications and improvements can be made without departing from the concepts described herein.

Except where mutually exclusive, any of the features may be employed separately or in combination with any other features and the disclosure extends to and includes all combinations and sub-combinations of one or more features described herein.

We claim:

1. A single-piece annular vane array for a gas turbine engine, the single-piece annular vane array comprising:

at least one mounting feature;

a ring of stator vanes; and at least one baffle, attached at a first radial location to the ring of stator vanes, and attached at a second radial location to the at least one mounting feature;

wherein the at least one baffle is deformable, wherein the at least one baffle comprises at least one aperture, wherein a thickness of the at least one baffle is greater in the area of the at least one aperture, and wherein the at least one aperture has a converging-diverging profile.

2. The single-piece annular vane array of claim 1, wherein, the ring of stator vanes are stator vanes of a compressor of the gas turbine engine or stator vanes of a turbine of the gas turbine engine.

3. The single-piece annular vane array of claim 1, wherein the at least one baffle is elastically deformable and/or plastically deformable.

4. The single-piece annular vane array of claim 1, wherein the at least one baffle comprises at least one annular corrugation, the annular corrugation extending in an axial direction and in a radial direction that is orthogonal to the axial direction.

5. The single-piece annular vane array of claim 1, wherein:

the at least one baffle is a radially inner baffle, wherein the radially inner baffle is attached at its first radial location to the ring of stator vanes and is attached at its second radial location to an inner mounting feature; or the at least one baffle is a radially outer baffle, wherein the radially outer baffle is attached at its first radial location to the ring of stator vanes and is attached at its second radial location to an outer mounting feature.

6. The single-piece annular vane array of claim 5, wherein the inner mounting feature locates a bearing of the gas turbine engine.

7. The single-piece annular vane array of claim 5, wherein the outer mounting feature and/or radially outer baffle form a portion of a casing of the gas turbine engine.

8. The single-piece annular vane array of claim 1, wherein:

the ring of stator vanes comprises a vane inner platform comprising at least one annular projection, having a component that extends in the an axial direction relative to the ring of stator vanes; or, the ring of stator vanes comprises a vane outer platform comprising at least one annular projection, having a component that extends in the axial direction relative to the ring of stator vanes.

9. The single-piece annular vane array of claim 8, wherein the at least one annular projection forms a portion of at least one seal between the single-piece annular vane array and an adjacent component of the gas turbine engine when the single-piece annular vane array is comprised within the gas turbine engine.

10. The single-piece annular vane array of claim 1, wherein the at least one aperture is non-circular.

11. The single-piece annular vane array of claim 10, wherein the at least one aperture is elliptical.

12. The single-piece annular vane array of claim 1, wherein, when the single-piece annular vane array is located within a gas turbine engine, the at least one baffle defines a boundary between a first chamber and a second chamber, and the at least one aperture fluidically connects the first chamber to the second chamber.

13. The single-piece annular vane array of claim 1, wherein the single-piece annular vane array is manufactured by additive layer manufacturing.

14. A gas turbine engine including a single-piece annular vane array of claim 1.

15. A method of manufacturing a single-piece annular vane array of claim 1, the method comprising the steps of:

forming a representation of the single-piece annular vane array of claim 1 by additive layer manufacturing, wherein the representation comprises the single-piece annular vane array and a support material that supports the single-piece annular vane array during a build-up of layers of the single-piece annular vane array; and finishing the representation of the single-piece annular vane array to form the single-piece annular vane array of claim 1.

16. The method of claim 15, wherein the at least one aperture is formed in the at least one baffle of the single-piece annular vane array during the forming of the representation of the single-piece annular vane array.

17. The method of claim 15, wherein the representation of the single-piece annular vane array comprises a stock material and finishing the representation of the single-piece annular vane array comprises at least partially removing the stock material to define at least one surface of the single-piece annular vane array.

18. The method of claim 17, wherein: the at least one surface of the single-piece annular vane array is at least one surface of an inner mounting feature of the single-piece annular vane array; or the at least one surface of the single-piece annular vane array is at least one surface of an outer mounting feature of the single-piece annular vane array.

19. The single-piece annular vane array of claim 1, wherein an axis of the at least one aperture is parallel with the principal and rotational axis of the gas turbine engine.

20. The single-piece annular vane array of claim 1, wherein an axis of the at least one aperture is non-parallel with the principal and rotational axis of the gas turbine engine.

* * * * *